United States Patent
Pirolli et al.

(10) Patent No.: US 8,114,817 B2
(45) Date of Patent: Feb. 14, 2012

(54) FILTERCAKE REMOVAL COMPOSITION AND SYSTEM

(75) Inventors: Laurent Pirolli, Houston, TX (US); Mehmet Parlar, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/720,886

(22) Filed: Mar. 10, 2010

(65) Prior Publication Data

US 2010/0167962 A1 Jul. 1, 2010

Related U.S. Application Data

(62) Division of application No. 11/947,439, filed on Nov. 29, 2007, now Pat. No. 7,712,536.

(51) Int. Cl.
| | |
|---|---|
| *C09K 8/68* | (2006.01) |
| *C09K 8/60* | (2006.01) |
| *C09K 8/74* | (2006.01) |
| *E21B 43/26* | (2006.01) |
| *E21B 21/00* | (2006.01) |
| *E21B 29/00* | (2006.01) |

(52) U.S. Cl. ........ 507/200; 507/201; 507/267; 507/269; 166/305.1; 166/311; 166/376

(58) Field of Classification Search .................. 507/200, 507/201, 267, 269; 166/305.1, 311, 376
See application file for complete search history.

(56) References Cited

U.S. PATENT DOCUMENTS

| | | | | |
|---|---|---|---|---|
| 4,809,783 | A * | 3/1989 | Hollenbeck et al. | 166/307 |
| 2005/0003968 | A1 * | 1/2005 | Simonides et al. | 507/211 |
| 2006/0283597 | A1 * | 12/2006 | Schriener et al. | 166/300 |

* cited by examiner

*Primary Examiner* — Timothy J. Kugel
*Assistant Examiner* — Atnaf Admasu
(74) *Attorney, Agent, or Firm* — Daniel N. Lundeen; David G. Matthews; Rodney Warfford

(57) ABSTRACT

A treatment fluid and system are disclosed for cleaning borehole filtercake using the treatment fluid, wherein the filtercake contains reservoir drilling fluid (RDF) solids. The treatment fluid comprises a fluoride source providing a 1.2 to 5 molar fluoride concentration, and another acid or combination of acids to provide a pH between 1.8 and 5. The treatment fluid is balanced for a dissolving power high enough to have significant dissolution of the filtercake, but low enough for even propagation to avoid premature leak-off.

20 Claims, No Drawings

FILTERCAKE REMOVAL COMPOSITION AND SYSTEM

CROSS REFERENCE TO RELATED APPLICATION(S)

This application is a divisional application of U.S. application Ser. No. 11/947,439, filed Nov. 29, 2007, now U.S. Pat. No. 7,712,536, which is hereby incorporated herein by reference.

TECHNICAL FIELD OF THE INVENTION

This invention relates to methods and compositions for the removal of filtercake, more particularly for the controlled removal of filtercake components including reservoir drilling fluid (RDF) solids and clays.

BACKGROUND OF THE INVENTION

When a well is drilled, reservoir drilling fluid (RDF) is circulated within the drilling equipment to cool down and clean the drill bit, remove the drill cuttings out of the well bore, reduce friction between the drill string and the sides of the borehole, and form a filtercake in order to prevent fluid leak off into the formation. The driving force for the formation of the filtercake is the higher wellbore pressure applied to maintain the borehole stability. This filtercake restricts the inflow of reservoir fluids into the wellbore during the drilling process and placement of the completion. If the filtercake damage that is created during the drilling process is not removed prior to or during completion of the well, a range of issues can arise when the well is put on production, i.e., completion equipment failures and impaired reservoir productivity.

Drilling fluid (mud), also called reservoir drilling fluid (RDF), can be synthetic/oil based or water based. To minimize invasion of the drilling fluid into the formation, both oil based and water based mud filtercakes typically contain a bridging or weighting agent, usually particles of calcium carbonate, barite or a mixture of the two, that bridge at the pore throats of the formation and thereby form a relatively low permeability filtercake. Both oil based and water based mud filtercakes also contain solids called cuttings that have been picked up during drilling, as opposed to the bridging/weighting agents that are added in the formulation of the drilling fluid. These solids can be quartz (sand), silts and/or shales, depending on the reservoir formation as well as the formations traversed by the drilling path to the reservoir. In addition, oil based drilling muds contain water droplets that become trapped in the pore space of the filtercake, while water based mud filtercakes contain polymers, such as starch and xanthan gum, and other inorganic salts.

The formation of a mud filtercake is often necessary for drilling, particularly in unconsolidated formations with wellbore stability problems and typically high permeabilities. However, from a production standpoint, the filtercake is certainly undesired. In certain types of completions, it is possible to produce hydrocarbons from these formations without performing any type of filtercake cleanup treatments. In other cases, as described in Brady et al., SPE 63232 (2000), a filtercake cleanup may be necessary to achieve the target production rates. Furthermore, although in some instances it is possible to produce hydrocarbons without any filtercake cleanup treatments, it is impossible to inject into the formation without a fracturing operation unless a cleanup treatment is performed. Such a fracturing operation is often undesirable. See Parlar et al., SPE 77449 (2002).

Conventional filtercake removal treatments use an array of chemicals specifically targeting two of the three components of the water-based RDF filtercake: (1) chelants or acids to dissolve the calcite component; and (2) enzymes or oxidizers to degrade the polymer component. For example, well treatment fluids for filtercake removal in gravel packing, available under the trade designation MudSOLV and described in U.S. Pat. No. 6,638,896 and U.S. Pat. No. 6,140,277, both to Tibbles et al., use a gravel carrying fluid containing enzyme for polymer removal in filter cake remediation, chelating agent to dissolve carbonate, and a viscoelastic surfactant (VES) system at a sufficiently high concentration to viscosify the fluid. However, these treatments fail to dissolve the third component of the water-based RDF filtercake, i.e., the drilling solids and clays. Removal of the bridging agents and polymeric components from the filtercake is often not sufficient to achieve acceptable injection rates. U.S. Pat. No. 6,978,838 discloses a three-step process to remove the filtercake by sequentially treating to remove each of the filtercake components, but does not disclose a method or composition for an effective single-fluid treatment to remove filtercake.

In the completion of injection wells, while the operators are pulling off the tools after perforation, screen placement or the like, the system can be under differential pressure and then once cleared, the valve is closed and a shut in period starts; during this time, the cleaning solution is reacting with the filtercake and dissolving the filtercake. Thus, a requirement for an effective filtercake treatment in injection wells would be that the treatment fluid dissolves the targeted components at a controlled rate while under differential pressure: a complete propagation of the fluid throughout the entire filtercake should be obtained before breakthrough occurs. Otherwise, all of the treatment fluid would go into the formation in regions where the filtercake has already been removed. See Parlar et al., SPE 50651 (1998). While the prior art has attempted and arguably achieved a balance of the trade-off between delayed reaction and complete dissolution for the calcite and polymer portions of the filtercake, there remains an unfilled need in the art for a way to dissolve drilling solids and clays at the same delayed rate.

Conventional mud acid treatment fluids are too corrosive to be used in filtercake removal fluids. Mud acid treatments of 12 weight percent hydrochloric acid (HCl) and 3 weight percent ammonium bifluoride ($NH_4F:HF$), referred to herein by the shorthand notation "12/3," and 9/1 mud acids (9 wt % HCl, 1 wt % $NH_4F:HF$), have typically been used to dissolve drilling solids and clays. However, these mud acid treatments are so reactive that significant amounts of silicon, aluminum, and calcium are all very rapidly complexed in solution, under differential pressure breakthrough occurs via pinholes formed in a short time period, and the treatment fluid is lost.

The high reactivity of mud acids results in a poor injectivity or permeability because the fluid leakoff leaves the filtercake intact except for the tiny holes, which subsequently become plugged by relatively small particles. Thus, mud acid treatments have resulted in premature pressure build up before any further fluid penetration. To solve this fast reactivity issue in the field, this typical mud acid treatment is injected into an isolated section of the horizontal well to favor complete propagation of the treatment to the entire section before breakthrough, and brine is injected right after the mud acid treatment to dilute the solution in an attempt to avoid corrosion of hardware, such as sand control screens, for example, due to the highly corrosive nature of conventional mud acids. Furthermore, these treatments often require relatively large quantities of mud acid to ensure contact even in isolated sections, as well as long rig times, which lead to very high cost particularly in deepwater environments.

There is a need in the art for mud acid type treatment fluids that can clean the filtercake in a single step to establish injectivity, but which are much less corrosive than the typical 12/3 or 9/1 mud acid treatments previously used in the field. Such a fluid would desirably have an optimum balance between a high dissolving power to have significant dissolution, but not too high to avoid premature leak-off under differential pressure.

SUMMARY OF THE INVENTION

This invention relates to a method of injecting chemical solutions capable of cleaning filtercake composed of polymers, carbonate, and drilled solids. Materials and techniques are identified herein to remove enough drilling fluid filtercake to recover permeability and in one embodiment place a wellbore on direct injection without flowback. In an embodiment the present invention provides chemical solutions that remove reservoir drilling fluid (RDF) filtercake in a single step without the aid of a catalyst or activator as a separate completion step. Additionally, in another embodiment this process can be used in other related oilfield processes such as matrix acidizing of sandstone, for example.

In one embodiment, the invention provides a method for cleaning borehole filtercake in a well comprising drilling fluid solids. The method can include the steps of: pumping a treatment fluid into the borehole in contact with the filtercake to be removed to establish a differential pressure between the treatment fluid and the formation adjacent the filtercake for a period of time; wherein the treatment fluid comprises (1) an aqueous solution of a fluoride source at a concentration from 1.2 to 5 molar fluoride, and (2) another acid or combination of acids effective to provide an initial pH in the solution at 25° C. between 1.8 and 5; and evenly propagating treatment of the filtercake during the differential pressure period to delay breakthrough by the treatment fluid for a period from at least about 1 or 2 hours up to 8 or 12 hours, optionally until the well is shut in.

In one embodiment, the method can include establishing permeability through the treated filtercake between the formation and the borehole. For example, the borehole can be in an injection well and method can include the step of injecting fluid into the formation, preferably following shut in. If desired, the fluid injection step can occur directly following shut in without flowback from the formation. Alternatively, the well can be a production well and the method can include the step of producing a fluid from the formation following the filtercake treatment.

In one embodiment, the differential pressure prior to shut in can be at least 1 MPa (145 psi) and/or the formation temperature can be at least 54° C. (129° F.) or, in another embodiment, at least 65° C. (149° F.).

In one embodiment, the fluoride source can be selected from the group consisting of ammonium fluoride, ammonium bifluoride, polyvinylammonium fluoride, polyvinylpyridinium fluoride, pyridinium fluoride, imidazolium fluoride, sodium tetrafluoroborate, ammonium tetrafluoroborate, salts of hexafluoroantimony, and the like, and mixtures thereof. Ammonium bifluoride is preferred.

In one embodiment, the other acid or combination of acids can include a mineral acid, and in another embodiment, the treatment fluid can include a combination of mineral acid and organic acid. Preferably, the mineral acid can be selected from HCl and/or $H_2SO_4$ and the organic acid from formic acid and/or oxalic acid. If desired, the treatment fluid can also include a corrosion inhibitor.

In embodiments, the filtercake can include at least 0.5, 1, 2 or 4 volume percent total drilling solids and clays. For example, the filtercake can be formed from an aqueous drilling fluid. If desired, the treatment fluid for treating the aqueous drilling fluid filtercake can also include an enzyme or oxidizer, or it can be substantially free of chelant, enzyme and oxidizer additives. As another example, the filtercake can be formed from an oil or invert emulsion drilling fluid. If desired, the treatment fluid for treating the oil or invert emulsion drilling fluid filtercake can also include a mutual solvent, a water-wetting agent or a combination thereof to disperse hydrophobic components in the filtercake. The mutual solvent, water-wetting agent or combination thereof can be present in the treatment fluid of one embodiment at from 2 to 10 volume percent.

In an alternate embodiment, the present invention provides a well treatment fluid for cleaning filtercake comprising drilling fluid solids and calcite. The well treatment fluid can include an aqueous mixture comprising a fluoride source at a concentration from 1.2 to 5 molar fluoride, a combination of mineral acid and organic acid effective to provide a pH in the mixture at 25° C. between 1.8 and 5, and a corrosion inhibitor. In one embodiment, the fluoride source can be selected from the group consisting of ammonium fluoride, ammonium bifluoride, polyvinylammonium fluoride, polyvinylpyridinium fluoride, pyridinium fluoride, imidazolium fluoride, sodium tetrafluoroborate, ammonium tetrafluoroborate, salts of hexafluoroantimony, and the like, and mixtures thereof. In a preferred embodiment, the fluoride source can include ammonium bifluoride.

In another embodiment of the composition, the mineral acid can be selected from HCl and $H_2SO_4$ and the organic acid from formic acid, oxalic acid, or from any of the combinations thereof. If desired, the treatment fluid can also include an enzyme or oxidizer, or it can be substantially free of chelant, enzyme and oxidizer additives. Further, the treatment fluid can also include from 2 to 10 volume percent of a mutual solvent, a water-wetting agent or a combination thereof.

DETAILED DESCRIPTION

In one embodiment, the treatment fluid of the present invention comprises an aqueous solution of from 1.2 to 5 molar of a fluoride source and another acid or combination of acids effective to provide an initial pH in the solution at 25° C. between 1.8 and 5. As used herein, the molarity of the fluoride source is on a fluoride basis and refers to the moles of fluoride provided by the fluoride source. For example, in one embodiment, a 1.2 molar fluoride source is equivalent to 0.6 molar ammonium bifluoride ($NH_4F:HF$) because each mole of bifluoride provides 2 moles of fluoride.

The fluoride source can be any compound that can provide or form fluoride ions in the treatment fluid, such as, for example, ammonium fluoride, ammonium bifluoride, polyvinylammonium fluoride, polyvinylpyridinium fluoride, pyridinium fluoride, imidazolium fluoride, sodium tetrafluoroborate, ammonium tetrafluoroborate, salts of hexafluoroantimony, and the like, and mixtures thereof. For the purposes of illustration and clarity, and not by way of limitation, the fluoride source compound is referred to herein below with reference to ammonium bifluoride ($NH_4F:HF$) as one example.

Water-based reservoir drilling fluid (RDF) filtercake is made up of calcite, polymers, and drilled solids and clays. For the fluid to be successful in removing the entire filtercake, it should dissolve all or most of these components at a rate that is low enough to prevent rapid breakthrough prior to complete fluid front propagation. Conventional 9/1 or 12/3 mud acids are candidates, but the dissolution is so fast that complete propagation of the treatment to substantially the entire filtercake before breakthrough is difficult to achieve, especially for horizontal wells. The mud acid treatment is so reactive that it can be lost through the formation of pinholes under differential pressure, leaving a substantial amount of filtercake in place. Obviously, the result of this poor cleaning is a reduced injectivity. Conventional 9/1 or 12/3 mud acids theoretically have a resulting pH much lower than 2, and are thus so reactive that even the measurement of its pH with conventional electrodes can be a challenge. Furthermore, mud acid treatments are extremely corrosive for tubulars, downhole assemblies and tools.

Our investigation of the dissolution of drilled solids and clays (RevDUST) with 2.85 weight percent $NH_4F$:HF in excess solution indicated that the percentage of drilled solids and clays dissolved, after 2 days at 79° C., drops significantly to 22 weight percent at an initial fluid pH of 4.75 to 0 weight percent at an initial pH of 5.0. See Table 1 below. The highest starting pH of the final solution before loss of efficiency was 4.5.

TABLE 1

Percentage of dissolution of drilled solids and clays for excess $NH_4F$:HF as a function of pH.

| pH | Drilled Solids Dissolution |
|---|---|
| 2.5 | 69 |
| 4.3 | 80 |
| 4.4 | 80 |
| 4.5 | 90 |
| 4.75 | 22 |
| 5.0 | 0 |
| 5.5 | 0 |
| 6 | 0 |
| 8.1 | 0 |
| 12 | 0 |

At low pH, however, the controlled dissolution of polymers is problematic. Enzyme efficiencies are impaired at relatively low pH, especially in the presence of calcium and strong acids. For example, the enzymes used in well treatment fluids for filtercake removal in gravel packing, for example, under the trade designation MudSOLV and described in U.S. Pat. No. 6,638,896 and U.S. Pat. No. 6,140,277, may not work properly in these conditions.

On the other hand, strong oxidizers such as sulfuric acid work well in the presence of $NH_4$:HF, which is a weak acid, but are overly reactive such that the resulting solution can be too aggressive for the polymers as well as too corrosive for tubulars, downhole assemblies, tools, and the like.

Furthermore, the controlled dissolution of calcite by chelant is problematic with $NH_4$:HF. The optimum concentration of disodium ethylene diamine tetraacetic acid ($(Na)_2$EDTA) to dissolve the maximum amount of calcite occurs at a pH of 4.5, for example, but $(Na)_2$EDTA reacts slowly to complex calcium. However, calcium-fluoride precipitates are much more stable thermodynamically than calcium-chelant complexes, or chelates. Moreover, starting at a pH around 4 at ambient pressure and high temperature, we could not find an additive to inhibit the formation of calcium-fluoride when the experiment lasted one or several days. As a result, all the treatments which were studied based on the optimum concentration of NH4F:HF with an initial pH around 4 were not able to complex calcium in solution after 6 hours at ambient pressure and high temperature (79° C. (175° F.)). Therefore, the combination of NH4F:HF with either of chelants and/or enzymes in the same solution was inefficient to dissolve the entire filtercake.

On the other hand, NH4F:HF based solutions start to complex calcium in solution around a pH=3.5 at ambient pressure and high temperature (79° C. (175° F.)). A substantial amount of calcium can be complexed in the first 2 to 8 hours under differential pressure at an initial pH of 4. Once shut in, the formation of $CaF_2$ precipitates enters the chemical equation resulting in a relatively low concentration of calcium in solution.

There is also an inherent volume restriction downhole, i.e. a limited volume of treatment solution filling the shut in wellbore section as compared to the amount of filtercake to be dissolved. Therefore, the dissolution of the drilled solids and clays is extremely difficult with low volumes of treatment fluid, which need to be fairly reactive to drilled solids and clays. Although not bound by theory, we believe the rate-limiting step is the silicon extraction from the alumino-silicate framework. The amount of drilled solids and clays in the filtercake is critical to filtercake reactivity and its resistance to dissolution. Therefore, a minimum concentration of NH4F:HF providing acceptable rates of silicon complex formation is about 0.6M (1.2M fluoride) or 3.4 weight percent, preferably at least 1M (2M fluoride) or 5.7 weight percent in an embodiment. An NH4F:HF concentration of 1M or 5.7 weight percent was the amount in the solutions studied which was observed to yield the maximum silicon complex formation after 2 days in the oven, and this solution had a pH of 4.5 at room temperature.

To maintain the pH of the NH4F:HF solution below 5, initially and also desirably during the treatment duration, and thus to preserve silicon complexing capability in solution, mineral acids, such as HCl or $H_2SO_4$, and/or strong organic acids, such as formic or oxalic acid, can be added. Other organic acids that may be mentioned for pH control include acetic acid, lactic acid, glycolic acid, sulfamic acid, malic acid, citric acid, tartaric acid, maleic acid, methylsulfamic acid, chloroacetic acid, aminopolycarboxylic acids, 3-hydroxypropionic acid, polyaminopolycarboxylic acids, for example trisodium hydroxyethylethylenediamine triacetate, and salts of these acids and mixtures of these acids and/or salts. Organic acids, salts, hydrolysable esters, and solid acid precursors can also be used to gradually generate protons. Furthermore, the NH4F:HF based solution can complex calcium in solution for a long period of time only at moderately low pH. Thus, at moderately low pH, calcite and RDF solids and clays can be dissolved at the same time.

If desired, enzymes or mild oxidizers that work at these conditions may optionally be employed in the treatment solution, provided that the dissolving strength is not made too great so that the excessive formation of pinholes and premature breakthrough do not occur. Enzymes can include, for example, oxidoreductases, hydrolases or lyases, especially hydrolase, e.g. cellulases, hemi-cellulases, pectinases, xanthanase, mannanase, α-galactosidase, amylase (α, β and/or γ) and the like, and mixtures thereof, which are capable of degrading polymeric substrates under low-pH conditions, especially the types of polysaccharides present in the filtercake. As used herein, enzyme classification (EC), subclasses and related terminology follow the Recommendations of the Nomenclature Committee of the International Union of Biochemistry and Molecular Biology on the Nomenclature and Classification of Enzymes by the Reactions They Catalyze, as reported in *Enzyme Nomenclature* 1992, Academic Press, San Diego, Calif. (1992) and its supplements to date.

Representative mild oxidizers which may be mentioned include ammonium persulfate, peroxides, sodium bromate and the like. The oxidizer, if used, should be present at a sufficiently low concentration to avoid premature breakthrough from pinhole formation and/or non-uniform removal of the filtercake.

While not wishing to be bound by theory, removal of the polymer filtercake component appears to be effectively achieved at these conditions even without using enzymes or oxidizers, or it is also possible that the propagation of the drilling solids and calcite removal with the present NH4F:HF solution is so even and thorough that it is not necessary to completely remove the polymer. Once the solution is injected downhole, the tools used for injection must be pulled up, and depending upon the depth and the length of the completion, this operation can take up to 8 or 12 hours. During this time, there is a differential pressure which favors breakthrough over complete propagation of the treatment to the entire filtercake. The main challenge at these conditions becomes the aggressiveness of the treatment towards the filtercake under differential pressure: the formation of pinholes must be controlled to avoid breakthrough under differential pressure, e.g. which can occur while the completion tools are being removed from the well. The higher the content of drilled solids and clays in the filtercake, the more resistant to complete dissolution the filtercake becomes. The lower the pH of the treatment, the higher the risk of complete leak-off under differential pressure.

The shut in period can also impact on the amount of filtercake dissolved as well as on the generation of precipitates. Consequently, the shut in period is critical in one embodiment to the density of the remaining filtercake and the resulting injectivity. However, the aggressiveness of the treatment to dissolve the entire filtercake will be determined by the formation of pinholes under differential pressure. Since the filtercake can be under differential pressure for the first 2 to 8 hours, the aggressiveness or acidity of the treatment should be adjusted to avoid breakthrough during this period. In embodiments, the pH is maintained above 1.8, 2, 2.5, 3 or 3.5, and below 5, 4.75, 4.5 or 4, or in a pH range from any lower limit to any upper limit.

In one embodiment, the well treatment fluid may include an ionic strength modifier such as a salt other than a fluoride salt present, for example, at a concentration of from 0.1 to 10 percent by weight, or from 0.5 to 5 percent by weight of the fluid. The parameters used in selecting the brine to be used in a particular well are known in the art, and the selection is based in part on the density that is required of the treatment fluid in a given well. Brines that may be used in the present invention can comprise $CaCl_2$, $CaBr_2$, NaBr, NaCl, KCl, potassium formate, ZnBr or cesium formate, among others. Brines that comprise $CaCl_2$, $CaBr_2$, and potassium formate are particularly preferred for high densities.

As is usually the rule for acid treatments, if desired, the treatment fluid can additionally include a corrosion inhibitor other than an organic acid. For example, formulations used in the method of the present invention can comprise small amounts of corrosion inhibitors based on quaternary amines, for example at a concentration of from about 0.2 or 0.4 to about 1.5, 1.0 or 0.6 weight percent, by weight of the treatment fluid. Some of the organic acids used herein for pH control, such as formic acid, where used at from about 0.1 to about 2.0 weight percent, for example, can also function as a corrosion inhibitor, but for the purposes of the present invention are excluded from consideration as an additional corrosion inhibitor.

The treatment fluid optionally contains added chelating agents, other than the fluoride source and other acid, for polyvalent cations such as, for example, aluminum, calcium and iron to prevent their precipitation. Chelating agents are sometimes also called sequestering agents, e.g. iron sequestering agents. Chelating agents are added at a concentration, for example, of about 0.5 percent by weight of the treatment fluid.

Optionally, the carrier fluid can further contain one or more additives such as surfactants, shale stabilizing agents such as ammonium chloride, tetramethyl ammonium chloride, or cationic polymers, corrosion inhibitor aids, anti-foam agents, scale inhibitors, emulsifiers, polyelectrolytes, buffers, non-emulsifiers, freezing point depressants, iron-reducing agents, bactericides and the like, provided that they do not interfere with the controlled dissolution of the filtercake as described herein.

The invention, accordingly, provides the following embodiments:

A. A method for cleaning borehole filtercake in a well comprising drilling fluid solids, comprising the steps of: pumping a treatment fluid into the borehole in contact with the filtercake to be removed to establish a differential pressure between the treatment fluid and the formation adjacent the filtercake; wherein the treatment fluid comprises an aqueous solution of a fluoride source at a fluoride concentration from 1.2 to 5 molar, and another acid or combination of acids effective to provide an initial pH in the solution at 25° C. between 1.8 and 5; and evenly propagating treatment of the filtercake during the differential pressure period to delay breakthrough by the treatment fluid for a period from 1 to 12 hours.

B. The method of embodiment A comprising establishing permeability through the treated filtercake between the formation and the borehole.

C. The method of either embodiment A or embodiment B wherein the borehole is in an injection well and further comprising the steps of shutting in the well during said differential pressure period, and injecting fluid into the formation following the shut in step.

D. The method of embodiment C wherein the fluid injection step occurs directly following the shut in step without flowback from the formation.

E. The method of either embodiment A or embodiment B wherein the well is a production well and further comprising the step of producing a fluid from the formation following the filtercake treatment.

F. The method of any preceding embodiment A through E wherein the differential pressure is at least 1 MPa (145 psi) and the formation temperature is at least 54° C. (129° F.).

G. The method of any preceding embodiment A through F wherein the fluoride source is selected from the group consisting of ammonium fluoride, ammonium bifluoride, polyvinyl ammonium fluoride, polyvinylpyridinium fluoride, pyridinium fluoride, imidazolium fluoride, sodium tetrafluoroborate, ammonium tetrafluoroborate, salts of hexafluoroantimony, and mixtures thereof H. The method of any preceding embodiment A through G wherein the fluoride source comprises ammonium bifluoride.

I. The method of any preceding embodiment A through H wherein the other acid or combination of acids comprise a mineral acid.
J. The method of any preceding embodiment A through I wherein the treatment fluid comprises a combination of mineral acid and organic acid.
K. The method of any preceding embodiment A through J wherein the other acid or combination of acids comprise a mineral acid selected from HCl and $H_2SO_4$, and the combination thereof
L. The method of any preceding embodiment A through K wherein the other acid or combination of acids comprise an organic acid selected from formic acid and oxalic acid and the combination thereof.
M. The method of any preceding embodiment A through L wherein the treatment fluid further comprises a corrosion inhibitor.
N. The method of any preceding embodiment A through M wherein the filtercake comprises at least 0.5 volume percent total drilling solids and clays, at least 1 volume percent total drilling solids and clays, at least 2 volume percent total drilling solids and clays, or at least 4 volume percent total drilling solids and clays.
O. The method of any preceding embodiment A through N wherein the filtercake is from an aqueous drilling fluid.
P. The method of any preceding embodiment A through O wherein the treatment fluid further comprises an enzyme or oxidizer.
Q. The method of any preceding embodiment A through O wherein the treatment fluid is substantially free of chelant, enzyme and oxidizer additives.
R. The method of any preceding embodiment A through N wherein the filtercake is from an oil or invert emulsion drilling fluid.
S. The method of any preceding embodiment A through R wherein the treatment fluid further comprises a mutual solvent, a water-wetting agent or a combination thereof to disperse hydrophobic components in the filtercake.
T. The method of embodiment S wherein the mutual solvent, water-wetting agent or combination thereof are present in the treatment fluid at from 2 to 10 volume percent.
U. A well treatment fluid for cleaning filtercake comprising drilling fluid solids and calcite, comprising an aqueous mixture comprising: a fluoride source at a fluoride concentration from 1.2 to 5 molar; a combination of mineral acid and organic acid effective to provide a pH in the mixture at 25° C. between 1.8 and 5; and a corrosion inhibitor.
V. The well treatment fluid of embodiment U wherein the fluoride source is selected from the group consisting of ammonium fluoride, ammonium bifluoride, polyvinylammonium fluoride, polyvinylpyridinium fluoride, pyridinium fluoride, imidazolium fluoride, sodium tetrafluoroborate, ammonium tetrafluoroborate, salts of hexafluoroantimony, and mixtures thereof
W. The treatment fluid of either embodiment U or embodiment V wherein the fluoride source comprises ammonium bifluoride.
X. The treatment fluid of any preceding embodiment U through W wherein the mineral acid is selected from HCl and $H_2SO_4$, and the combination thereof.
Y. The treatment fluid of any preceding embodiment U through X wherein the organic acid is selected from formic acid and oxalic acid and the combination thereof.
Z. The treatment fluid of any preceding embodiment U through Y further comprising an enzyme or oxidizer.
AA. The treatment fluid of any preceding embodiment U through Y wherein the fluid is substantially free of chelant, enzyme and oxidizer additives.
BB. The treatment fluid of any preceding embodiment U through AA further comprising from 2 to 10 volume percent of mutual solvent, water-wetting agent or combination thereof.

EXAMPLES

Comparative Examples 1 and 2

Taking into account the volume restriction of the solution versus the amount of filtercake downhole, 12/3 (Comparative Example 1) or 9/1 (Comparative Example 2) mud acid (12 wt % or 9 wt % HCl and 3 wt % or 1 wt % $NH_4F$:HF) are currently the only treatments with a dissolving power high enough to dissolve the entire filtercake in one step. However, this can only be accomplished in the absence of differential pressure, and therefore does not accurately represent a treatment pumped at actual field conditions. Nevertheless, mud acid treatments can be used as a reference in the laboratory. It should be pointed out that the experimental set up in the laboratory for these examples does not reproduce the propagation versus the breakthrough issue for horizontal wells since the solution is in contact with the entire filtercake in the experimental set up directly from the onset.

The filtercake was built with 1 or 4 volume percent RevDUST under dynamic conditions during 30 minutes on a ceramic filter disc having a 63.5 mm (2.5 in.) diameter, 6.35 mm (0.25 in.) thickness, and 3 microns mean pore diameter, from Fann Instrument Company. The temperature 93° C. (200° F.) and pressure 3.45 MPa (500 psi) were still applied after the dynamic stage for an additional 15.5 hours.

Both mud acid treatments (12/3 or 9/1) were so reactive with both types of filtercakes representing the extreme in drilled solids and clays concentration in the field (1 or 4 volume percent RevDUST) under high pressure (3.45 MPa (500 psi)) and at high temperature (93° C. (200° F.)) that all the fluid was lost through the pinholes before 2 hours. Significant amounts of silicon, aluminum, and calcium were complexed in solution rapidly. The formation of pinholes was attributed to the dissolution of alumino-silicate or combination of alumino-silicate and calcium dissolutions since the double amount of calcium could have been complexed in solution without achieving breakthrough. This high reactivity resulted in a poor return injectivity because the treatment leaked through tiny holes. Furthermore, these minuscule holes were plugged when the cell was subsequently filled with brine leading to significant pressure build up before any further fluid penetration.

Examples 1 and 2

A treatment capable of dissolving enough of the two types of filtercake to have enough return permeability after 2 hours under differential pressure for the filtercake containing 1% v/v RevDUST drilling solids (Example 1), and after 8 hours under differential pressure for the filtercake containing 4% v/v RevDUST drilling solids (Example 2), was prepared with 73 mL of 5.7 wt % NH4F:HF and 6 wt % of hydrochloric acid (pH 2.1), which was used to clean both types of filtercake. This cleaning treatment resulted in a retained permeability of 15% with the Example 1 filtercake containing 1% v/v RevDUST drilling solids after 2 hours under a differential pressure of 3.45 MPa (500 psi) and 45 hours shut in at 93° C. (200° F.). This same cleaning treatment led to a retained permeability of 6% with the filtercake of Example 2 containing 4% v/v RevDUST drilling solids after 8 hours under a differential pressure of 3.45 MPa (500 psi) and 60 hours shut in at 93° C. (200° F.). It should be pointed out that the typical 12/3 or 9/1 mud acid cleaning treatment leads to a build up pressure more than 10 times higher than this simple treatment. The retained permeabilities in this example according to the present invention give an approximate skin factor between 1 and 3, which is much lower than what is found currently with the conventional mud acid treatments. These solutions have an optimum balance between a dissolving power high enough to have significant dissolution but not too high to avoid premature leak-off under differential pressure. This will save operation time and money.

Example 3

The procedure of Example 1 was repeated using a 2% v/v RevDUST filtercake built on the ceramic disc, and an aqueous treatment fluid of 8.55 wt % (1.5 M) $NH_4$:HF, 7.3 wt % (2 M) HCl, 2.6 wt % (0.5 M) formic acid, and 4.65 wt % (0.375 M) oxalic acid, having an initial pH of 2.2. The treatment achieved 31% retained permeability after 1.5 hours under 3.45 MPa (500 psi) and 40 hours shut in at 93° C. (200° F.).

Example 4

The procedure of Example 1 was repeated using a 2% v/v RevDUST filtercake built on the ceramic disc, and an aqueous treatment fluid of 5.7 wt % (1 M) $NH_4$:HF, 5.5 wt % (1.5 M) HCl, 2.6 wt % (0.5 M) formic acid, and 3.1 wt % (0.25 M) oxalic acid, having an initial pH of 2.5. The treatment achieved 15% retained permeability after 5 hours under 3.45 MPa (500 psi) and 40 hours shut in at 93° C. (200° F.).

Example 5

The procedure of Example 1 was repeated using a 2% v/v RevDUST filtercake built on a 25.4 mm (1 in.) core under static conditions for 16 hours at 3.45 MPa (500 psi) at 93° C. (200° F.). The aqueous treatment fluid was comprised of 8.55 wt % (1.5 M) $NH_4$:HF, 8.25 wt % (2.25 M) HCl, 2.6 wt % (0.5 M) formic acid, and 3.75 wt % (0.3 M) oxalic acid, and had an initial pH of 2.0. The treatment achieved 9% retained permeability after 0.5 hours under 3.45 MPa (500 psi) and 70 hours shut in at 93° C. (200° F.).

Although the methods have been described here for, and are most typically used for, hydrocarbon production, they can also be used in injection wells and for production of other fluids, such as water or brine. The particular embodiments disclosed above are illustrative only, as the invention can be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above can be altered or modified and all such variations are considered within the scope and spirit of the invention. Accordingly, the protection sought herein is as set forth in the claims below.

All patents and other documents cited herein are fully incorporated herein by reference to the extent such disclosure is not inconsistent with this invention and for all jurisdictions in which such incorporation is permitted.

What is claimed is:

1. A composition, comprising an aqueous mixture comprising:
   a fluoride source at a fluoride concentration from 1.2 to 5 molar;
   a combination of acids effective to provide a pH in the mixture at 25° C. between 1.8 and 5, wherein the acids comprise at least one mineral acid; and
   a corrosion inhibitor.

2. The composition of claim 1, wherein the acids further comprise an organic acid.

3. The composition of claim 2 wherein the organic acid is selected from formic acid, oxalic acid and the combination thereof.

4. The composition of claim 1, wherein the fluoride source is selected from the group consisting of ammonium fluoride, ammonium bifluoride, polyvinylammonium fluoride, polyvinylpyridinium fluoride, pyridinium fluoride, imidazolium fluoride, sodium tetrafluoroborate, ammonium tetrafluoroborate, salts of hexafluoroantimony, and mixtures thereof.

5. The composition of claim 1, wherein the fluoride source comprises ammonium bifluoride.

6. The composition of claim 1 wherein the mineral acid is selected from HCl, $H_2SO_4$ and the combination thereof.

7. The composition of claim 1 further comprising an enzyme or oxidizer.

8. The composition of claim 1 wherein the composition is substantially free of chelant, enzyme and oxidizer additives.

9. The composition of claim 1 further comprising mutual solvent, water-wetting agent or combination thereof.

10. The composition of claim 9 wherein the mutual solvent, water-wetting agent or combination thereof is present at from 2 to 10 volume percent.

11. A composition, comprising an aqueous mixture comprising:
    a fluoride source at a fluoride concentration from 1.2 to 5 molar, wherein the fluoride source is selected from the group consisting of ammonium fluoride, ammonium bifluoride, polyvinylammonium fluoride, polyvinylpyridinium fluoride, pyridinium fluoride, imidazolium fluoride, sodium tetrafluoroborate, ammonium tetrafluoroborate, salts of hexafluoroantimony, and mixtures thereof; and
    a combination of mineral acid and organic acid effective to provide a pH in the mixture at 25° C. between 1.8 and 5, wherein the mineral acid is selected from HCl, $H_2SO_4$ and the combination thereof, wherein the organic acid is selected from formic acid, oxalic acid and the combination thereof.

12. A well treatment system for cleaning filtercake, comprising
    an aqueous mixture in contact with a filtercake;
    wherein the filtercake comprises drilling fluid solids and calcite;
    wherein the filtercake comprises at least 0.5 volume percent total drilling solids and clays;
    wherein the aqueous mixture comprises:
       a fluoride source at a fluoride concentration from 1.2 to 5 molar; and
       acid in an amount effective to provide a pH in the mixture at 25° C. between 1.8 and 5.

13. The well treatment system of claim 12 wherein the filtercake comprises at least 1 volume percent total drilling solids and clays.

14. The well treatment system of claim 12 wherein the acid comprises a mineral acid.

15. The well treatment system of claim 12 wherein the acid comprises a combination of the mineral acid and an organic acid.

16. The well treatment system of claim 12 wherein the acid comprises a combination of mineral acid and organic acid effective to provide a pH in the mixture at 25° C. between 1.8 and 5, wherein the mineral acid is selected from HCl, $H_2SO_4$ and the combination thereof, wherein the organic acid is selected from formic acid, oxalic acid and the combination thereof.

17. The well treatment system of claim 12 wherein the aqueous mixture further comprises a corrosion inhibitor.

18. The well treatment system of claim 12 wherein the aqueous mixture comprises brine comprising a salt other than a fluoride salt present at a concentration of from 0.1 to 10 percent by weight of the aqueous mixture.

19. The well treatment system of claim 12 wherein the fluoride source comprises ammonium bifluoride.

20. The well treatment system of claim 12 comprising a differential pressure at the filtercake of at least 1 MPa (145 psi).

* * * * *